Dec. 2, 1969 B. L. BRENIN 3,482,190

PHASE SHIFTING APPARATUS

Filed Aug. 8, 1966 4 Sheets-Sheet 1

INVENTOR.
BARRY L. BRENIN

BY Harry A. Herbert Jr and George Fine

ATTORNEYS

AMPLITUDE RATIO VS CIRCUIT Q

INVENTOR.
BARRY L. BRENIN
BY Harry A. Herbert Jr and George Fine
ATTORNEYS

INVENTOR.
BARRY L. BRENIN
BY Harry A. Herbert Jr. and George Fine
ATTORNEYS

INVENTOR.
BARRY L. BRENIN
BY Harry A. Herbert Jr. and George Fine
ATTORNEYS

United States Patent Office 3,482,190

Patented Dec. 2, 1969

3,482,190

PHASE SHIFTING APPARATUS

Barry L. Brenin, West Hempstead, N.Y., assignor to the United States of America as represented by the Secretary of the Air Force Filed Aug. 8, 1966, Ser. No. 571,144
Int. Cl. H03h 7/30
U.S. Cl. 333—29 1 Claim

ABSTRACT OF THE DISCLOSURE

Phase shifting apparatus operating over a predetermined bandwidth including a tapped delay line with the outputs therefrom weighted to provide the required bandwidths and phase shift.

The present invention relates to phase shifter apparatus and more particularly to apparatus including a tapped delay line configuration wherein a phase shift of any predetermined value can be achieved with phase and amplitude fluctuations as small as desired in a given frequency band.

In the description of the present invention, there is included theory, design, and performance data for transversal, wideband, constant phase-shift networks. Using a relatively simple configuration, a phase shift of any value can be achieved with phase and amplitude fluctuations as small as desired in a given frequency band. Associated with the phase shift is a fixed delay which increases as the amplitude and phase tolerances become more stringent and which decreases as the center frequency increases.

An object of the present invention is to provide phase shifting apparatus including a tapped delay line.

Another object of the present invention is to provide phasing shifting apparatus including a tapped delay line with the output thereof weighted.

Various other objects, advantages, and features of novelty which characterize the invention are pointed out with particularity in the claims annexed hereto and forming a part hereof. However, for a better understanding of the invention, its advantages, and objects attained by its use, reference should be had to the subjoining drawings, which form a further part hereof, and to the accompanying descriptive matter.

An arbitrary phase shift $\theta$, corresponding to the transfer function $F(\omega)=e^{j\theta}$, can be considered as the weighted output of 90° ($\pi/2$) and 0° phase shifters, i.e., $$F(\omega)=e^{j\theta}=\cos\theta e^{j\theta}+\sin\theta e^{j\frac{\pi}{2}} \qquad (1)$$

Here, an in what follows, a transfer function will be specified only for positive $\omega$ in order to avoid unnecessarily cumbersome notation such as:

$$e^{j\theta \sin \omega}$$

The key to the design of an arbitrary-phase shifter is thus the design of a 90° phase shifter, as presented below.

Figure 1:
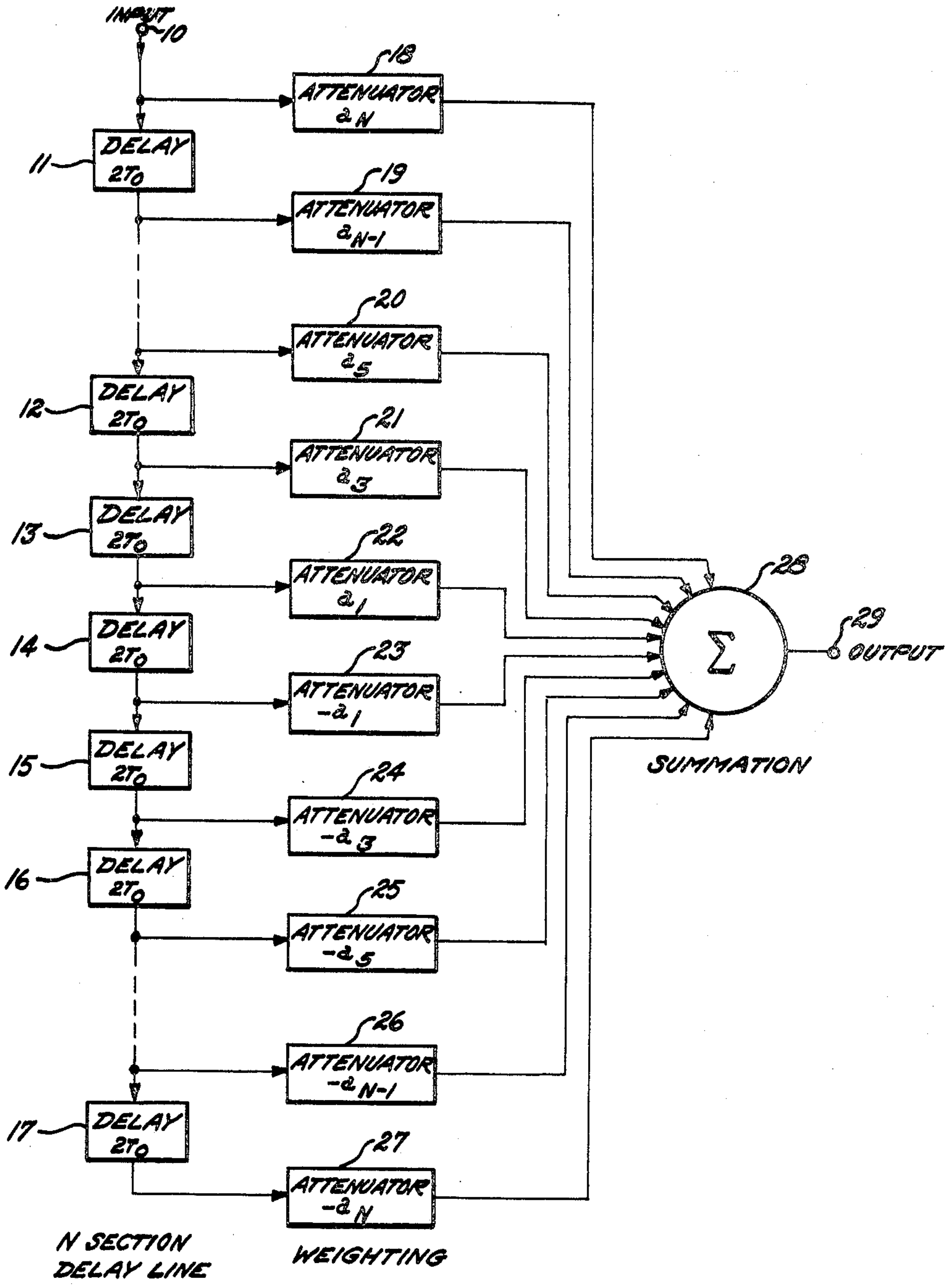
FIGURE 1 shows a block diagram of a basic 90° phase shifter.

The basic configuration to be used is a tapped delay line with an odd number, N, of sections 11–17 of $2T_0$ delay each. The output taps are summed with the odd symmetry weighting shown in FIGURE 1. The weighting is provided by attenuators 18–27. The summing is provided by summer 29. Terminal 10 receives the input signal to be phase shifted. Terminal 29 serves as the output for the phase shifting apparatus. The transfer function of this device, relating the output of the summer to the delay line input is $$T(\omega)=e^{j\pi/2}e^{-jNT_0\omega}\sum_{\substack{K=1\\K_{odd}}}^{N}2a_K \sin KT_0\omega \qquad (2)$$

The first term, $e^{j\pi/2}$ is the desired 90° phase shift, and is independent of frequency. The $e^{-jNT_0\omega}$ term is a frequency independent delay of $NT_0$, equal to the delay from the line input to its (untapped) center. The summation in (2) is the amplitude of $T(\omega)$, expressed as the sum of weighted, odd harmonics of sin $T_0\omega$, and is algebraically even about $\omega_0=\pi/2T_0$.

Given a frequency band of arithmetic center $\omega_0$, a 90° phase shift can be achieved over this band with arbitrary flatness by choosing N sufficiently large and properly choosing the values of the $a_K$'s, provided the lower band edge is not $\omega=0$. This is evident when noting that a Fourier series of a rectangular pulse from $\omega=0$ to $\omega=2\omega_0$ consists of odd sin $T_0\omega$ harmonics, and will produce an arbitrarily close approximation for a sufficient number of terms. At the edges $\omega=0$ and $\omega=2\omega_0$, the Fourier series does not converge to the pulse, hence the $\omega=0$ exclusion.

The procedure for the design of a 90° phase shifter is to determine $T_0$ through the use of $$T_0=\frac{\pi}{2\omega_0}=\frac{1}{4f_0} \qquad (3)$$

and to determine the smallest value of N and the values of the $a_K$ which meet the required flatness over the specified frequency interval.

Figure 2:
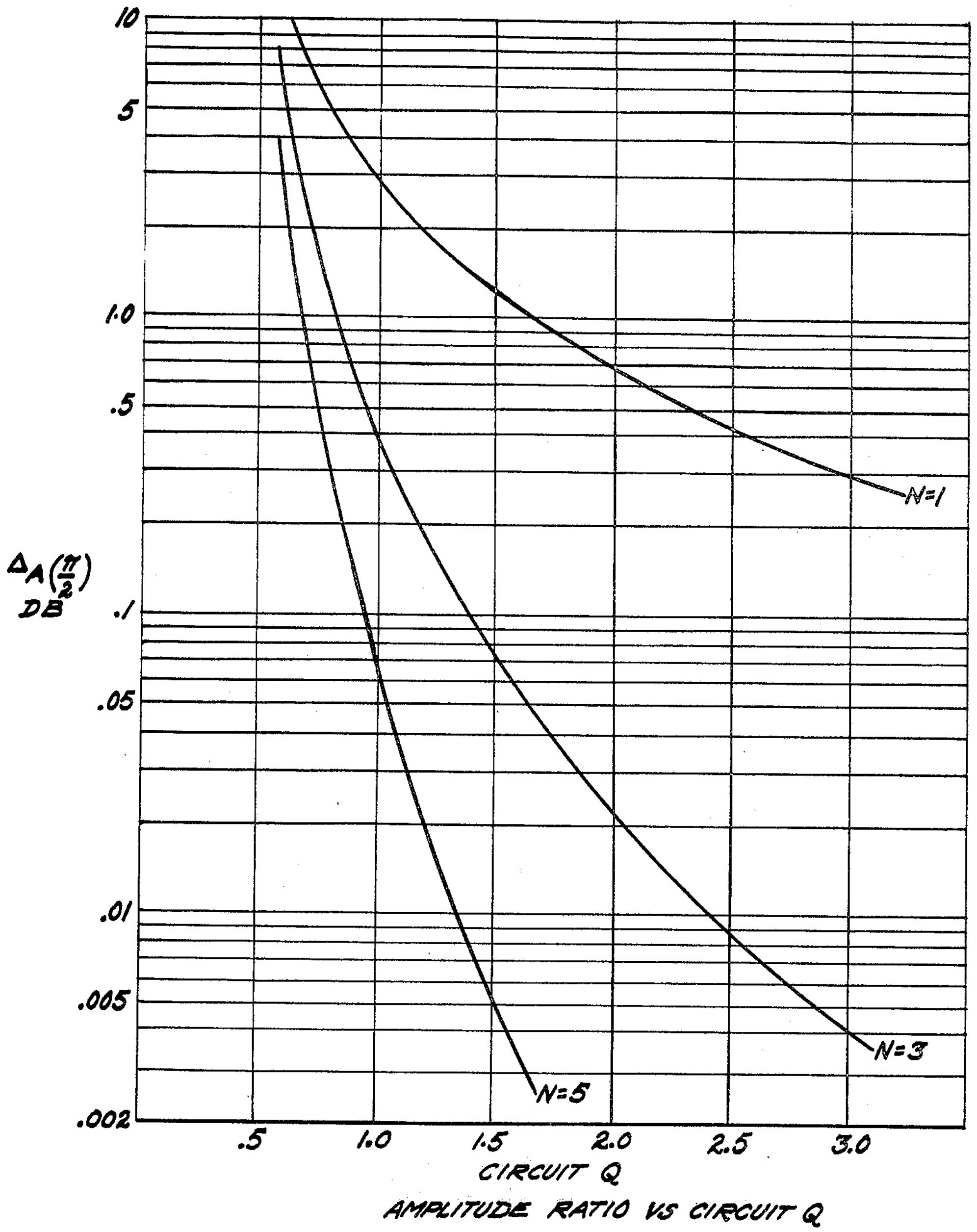
FIGURE 2 shows design curves of amplitude ratio vs. circuit Q utilized for the phase shifter of the present invention.

This procedure can be aided by the design curves in FIGURE 2, and Tables I, II, and III. These figures and tables show the smallest peak-to-peak amplitude ratio, $\Delta_A(\pi/2)$, obtainable for $N=1$, 3, and 5 as a function of the center frequency to bandwidth ratio, Q. The values of the tap weightings, $a_K$, are given for these cases, normalized to produce an average magnitude of unity over the band.

These coefficients were obtained with the aid of a digital computer by finding a minimum mean square error fit to unity using N terms (for $N=1$, 3 and 5) and perturbing the coefficients to minimize peak-to-peak deviation. The final coefficients were normalized so that the average magnitude was unity. The lower limit of Q of .5 corresponds to a band from 0 to $2\omega_0$.

TABLE I

| Q | $a_1$ | $\Delta_A(\pi/2)_{db}$ |
|---|---|---|
| .6 | .678 | 11.740 |
| .8 | .590 | 5.105 |
| 1.0 | .555 | 3.010 |
| 1.2 | .538 | 2.011 |
| 1.4 | .527 | 1.445 |
| 1.6 | .521 | 1.091 |
| 1.8 | .516 | .854 |
| 2.0 | .513 | .688 |
| 2.2 | .511 | .566 |
| 2.4 | .509 | .474 |
| 2.6 | .508 | .402 |
| 2.8 | .507 | .346 |
| 3.0 | .506 | .311 |

TABLE II

| Q | $a_1$ | $a_3$ | $\Delta_A(\pi/2)_{db}$ |
|---|---|---|---|
| .6 | .631 | .189 | 5.814 |
| .8 | .600 | .135 | 1.090 |
| 1.0 | .589 | .101 | .387 |
| 1.2 | .582 | .087 | .174 |
| 1.4 | .577 | .079 | .091 |
| 1.6 | .574 | .075 | .052 |
| 1.8 | .571 | .072 | .032 |
| 2.0 | .569 | .070 | .021 |
| 2.2 | .568 | .069 | .114 |
| 2.4 | .568 | .068 | .110 |
| 2.6 | .567 | .067 | .007 |
| 2.8 | .566 | .066 | .005 |
| 3.0 | .566 | .066 | .004 |

TABLE III

| Q | $a_1$ | $a_3$ | $a_5$ | $\Delta_A(\pi/2)_{db}$ |
|---|---|---|---|---|
| .6 | .624 | .190 | .132 | 2.558 |
| .8 | .612 | .147 | .043 | .268 |
| 1.0 | .602 | .126 | .024 | .070 |
| 1.2 | .598 | .117 | .020 | .0203 |
| 1.4 | .594 | .111 | .017 | .0077 |
| 1.6 | .593 | .108 | .116 | .0032 |
| 1.8 | .591 | .106 | .015 | .0014 |
| 2.0 | .590 | .105 | .014 | .0008 |

Figure 3:
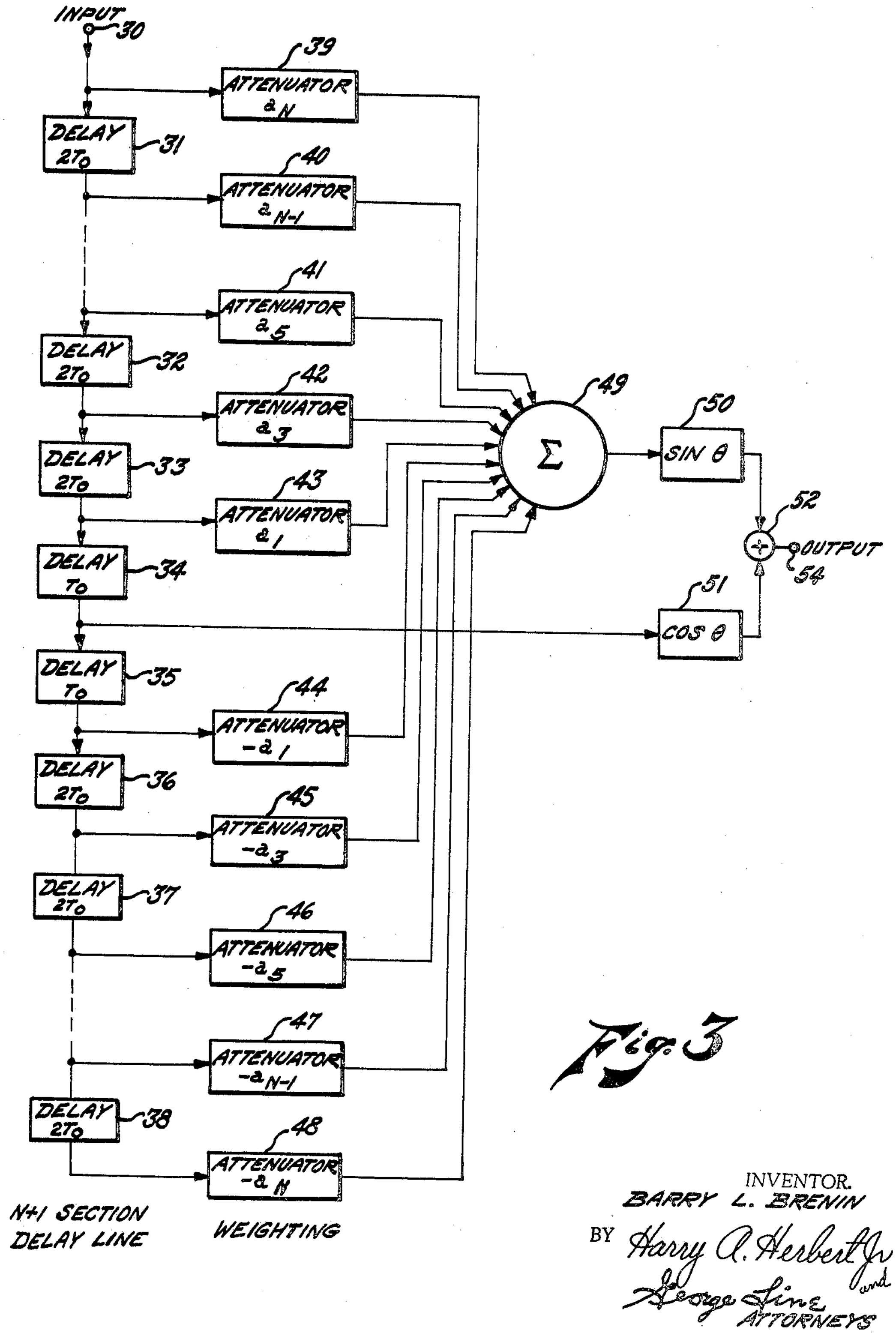
FIGURE 3 shows a block diagram for $\theta$ phase shifter.

As Equation 1 indicates, an arbitrary phase shift, $\theta$ is obtained by appropriately weighting and adding together the outputs of 0° and 90° phase shifters. The 90° phase shifter described above has an inherent delay of $NT_0$ which should be present in the 0°-shifted signal as equalization. The center of the tapped delay line discussed above provides the required $NT_0$ delay without phase shift and leads to the configuration of FIGURE 3 for a general phase-shifting network. The sin $\theta$ gain can be absorbed into the $a_K$ weighting or can be kept separate and ganged with the cos $\theta$ gain to provide a variable phase shifter.

The signal to be phase shifted is received at input terminal 30. The delay line sections 31–38 have the output taps thereof feeding attenuators 39–48 which provide weighting. The outputs of attenuators 39–48 are passed through summer 49 to sin $\theta$ network 50. The center output tap 54 is connected to cos $\theta$ network 51. The outputs of networks 50 and 51 are fed to adder 52 and the output is connected to terminal 53.

Figure 4:
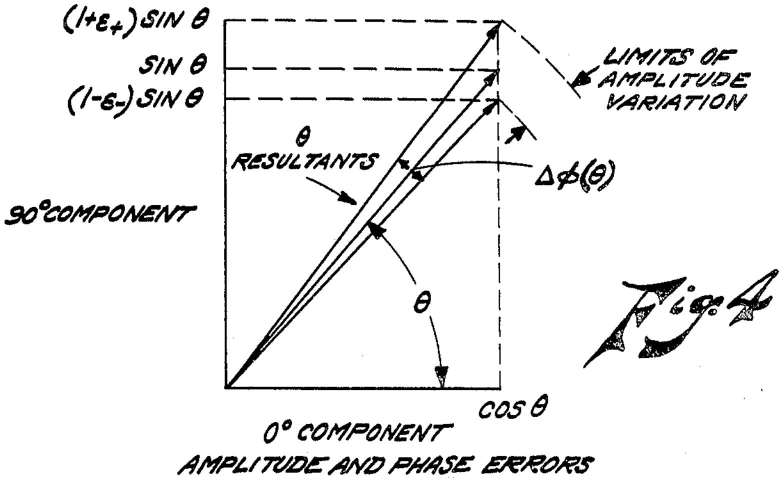
FIGURE 4 illustrates a phasor diagram for $\theta$ phase shifter of FIGURE 3.

As the amplitude of the 90° component varies the resultant $\theta$ component varies in amplitude and phase as indicated in the phasor diagram of FIGURE 4. In particular when the $\pi/2$ component varies between its extrema of $(1-\epsilon_-)$ sin $\theta$ and $(1+\epsilon_+)$ sin $\theta$ the resultant peak-to-peak variation of the $\theta$ component is $$\Delta_A(\theta)=\left(\frac{1+2\epsilon_+\sin^2\theta+\epsilon_+^2\sin^2\theta}{1-2\epsilon_-\sin^2\theta+\epsilon_-^2\sin^2\theta}\right)^{1/2} \tag{4}$$

When $\epsilon_-$ and $\epsilon_+$ are both small compared to unity, $\Delta_A$ can be approximated as $$\Delta_A(\theta)=1+(\epsilon_++\epsilon_-)\sin^2\theta \tag{5}$$

which, on a decibel basis is $$\Delta_A(\theta)_{db}=\sin^2\theta\Delta_A(\pi/2)_{db} \tag{6}$$

As the $\pi/2$ component varies from $(1-\epsilon_-)$ sin $\theta$ to $(1+\epsilon_+)$ sin $\theta$, the phase variation of the $\theta$ resultant is $$\Delta_\phi(\theta)=\tan^{-1}[(1+\epsilon_+)\tan\theta]-\tan^{-1}[(1-\epsilon_-)\tan\theta] \tag{7}$$

For values of $\epsilon_-$ and $\epsilon_+$ small compared with unity, a power series approximation to (7), retaining first order $\epsilon_-$ and $\epsilon_+$ terms yields $$\Delta_\phi(\theta)=(\epsilon_++\epsilon_-)\frac{\sin 2\theta}{2}\text{ (radians)} \tag{8}$$

In terms of $$\Delta_A(\pi/2)_{db}=20(\epsilon_++\epsilon_-)\log_{10}e$$

$$\Delta_\phi(\theta)=\Delta_A(\pi/2)_{db}\times\frac{\sin 2\theta}{17.3718}\text{ (radians)} \tag{9}$$

For a given value of $\Delta_A(\pi/2)$, a $\theta$ phase shifter can be built and yields $\Delta_\phi$, and $\Delta_A$ as given in Equation 6 and Equation 9, respectively, and which are themselves related by $$\frac{\Delta_A}{\Delta_\phi}=8.6859\tan\theta \tag{10}$$

A design procedure consists of determining the smaller of the two values of $\Delta_A(\pi/2)$ determined from amplitude and phase requirements in Equation 6 and Equation 9. This value of $\Delta_A(\pi/2)$, together with the circuit Q desired, determines a minimum value of N, which in turn leads to a set of weighting coefficients.

Figure 5:
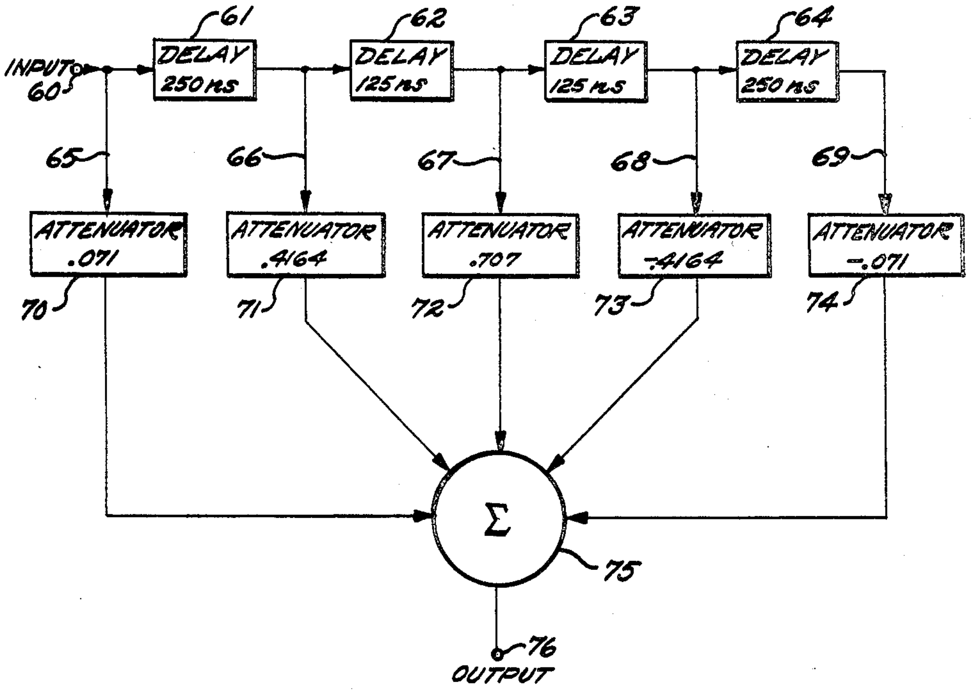
FIGURE 5 shows a block diagram of a 45° phase shifter in accordance with the present invention.

As an example, a 45° phase shifter is shown in FIGURE 5 extending from 1 mc. to 3 mc. The amplitude must have no more than ½db P—P deviation and the phase must fluctuate less than 2°. The bandwidth of 2 mc. and center frequency of 2 mc. specify $Q=1$ and $T_0=1/8$ mc.=125 ns. The value of $\Delta_A(\pi/2)$ calculated from (6) using $\Delta_A(\pi/4)_{db}=.5$, is $\Delta_A(\pi/2)_{db}=1$. Using 2° (=.0349 radians) in (9), $\Delta_A(\pi/2)_{db}=.60$. Both values of $\Delta_A(\pi/2)$ specify $N\geq 3$ and the design is shown in FIGURE 5 leading to final deviations from flatness of .19 db in amplitude and 1.27° in phase. Thus the 45° phase shifter apparatus of FIGURE 5 is shown as having an input terminal 60 to receive the signal to be phase shifted a predetermined 45°. The input signal is fed to the tapped delay line configuration comprised of delay line sections 61–64. Sections 61 and 64 having a preselected delay of 250 nonoseconds and sections 62 and 63 having a preselected delay of 125 nonoseconds. Taps 65–69 are provided from the delay line configurations which are connected to attenuators 70 and 74, respectively. To provide the calculated weighting, attenuators 65 and 69 attenuate .071 and —.071, respectively; attenuators 71 and 73, .4164 and —.4164, respectively; and attenuator 72, .707. The outputs of attenuators 70–74 are fed to summer 75 and a 45° phase shifted signal is provided at output terminal 76.

What I claim is:

1. Apparatus operating over a predetermined bandwidth to shift the phase of a signal a predetermined magnitude comprising a tapped delay line having an input and center tap, said input tap receiving said signal to be phase shifted, said tapped delay line having a first set of sections disposed on one side of said center tap and a second set of sections, equal in number to said first set of sections, disposed on the other side of said center tap, each of said first and second sets of sections having an input and output, a first and second set of weighting means, each one of said first set of weighting means having an associated section from said first set of sections and being connected to said input thereto, each one of said second set of weighting means having an associated section from said second set of sections and connected to said output thereof, each one of said weighting means and its associated section being preselected in combination to provide said predetermined bandwidth and phase shift magnitude, first means to sum the output signals from said first and second sets of weighting means to provide a first resultant signal, a sine $\theta$ network receiving as an input said first resultant signal, a cosine $\theta$ network receiving an input signal from said center tap, second means to sum the signals from said sine $\theta$ and cosine $\theta$ networks to provide the phase shifted signals.

References Cited

UNITED STATES PATENTS

| | | | |
|---|---|---|---|
| 2,128,257 | 8/1938 | Lee | 333—70 |
| 3,050,700 | 8/1962 | Powers | 333—28 |
| 3,292,110 | 12/1966 | Becker et al. | 333—18 |
| 3,375,473 | 3/1968 | Lucky | 333—18 |
| 3,271,703 | 9/1966 | Kaenel | 333—28 |

HERMAN KARL SAALBACH, Primary Examiner

C. BARAFF, Assistant Examiner

U.S. Cl. X.R.

323—108; 333—18, 28, 70